United States Patent
Goenka et al.

(10) Patent No.: US 12,445,237 B2
(45) Date of Patent: Oct. 14, 2025

(54) SYSTEMS AND METHODS FOR OFDMA POWER EQUALIZATION

(71) Applicant: ARRIS Enterprises LLC, Suwanee, GA (US)

(72) Inventors: Anand Kumar Goenka, Bengaluru (IN); Xinfa Ma, Acton, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 344 days.

(21) Appl. No.: 18/141,916

(22) Filed: May 1, 2023

(65) Prior Publication Data
US 2023/0412326 A1 Dec. 21, 2023

Related U.S. Application Data

(60) Provisional application No. 63/338,849, filed on May 5, 2022.

(51) Int. Cl.
*H04W 52/14* (2009.01)
*H04L 5/00* (2006.01)

(52) U.S. Cl.
CPC ......... *H04L 5/0007* (2013.01); *H04W 52/146* (2013.01)

(58) Field of Classification Search
CPC ....... H04W 52/146; H04B 3/04; H04L 5/0007
See application file for complete search history.

(56) References Cited

U.S. PATENT DOCUMENTS

| | | | |
|---|---|---|---|
| 9,237,040 B1 | 1/2016 | Jin | |
| 9,634,695 B1* | 4/2017 | Subrahmaniyan Radhakrishnan | H03F 3/24 |
| 9,719,933 B1* | 8/2017 | Paproski | G01N 21/274 |
| 10,873,405 B2* | 12/2020 | Bazzi | H04B 7/0617 |
| 2006/0256325 A1* | 11/2006 | Mcmillan | G01N 21/9501 356/237.2 |
| 2007/0280626 A1* | 12/2007 | Haddock | G02B 7/36 385/147 |
| 2011/0116400 A1* | 5/2011 | Park | H04W 52/08 370/252 |
| 2012/0115423 A1* | 5/2012 | Sang | H04L 27/2657 455/75 |
| 2013/0266310 A1 | 10/2013 | Fox et al. | |
| 2016/0006523 A1* | 1/2016 | Frenger | H04B 17/104 370/252 |
| 2016/0050127 A1 | 2/2016 | Prodan | |
| 2016/0099762 A1* | 4/2016 | Wu | H04B 7/0456 370/329 |
| 2018/0159670 A1* | 6/2018 | Hsu | H04L 5/0032 |

(Continued)

OTHER PUBLICATIONS

International Search Report and Written Opinion RE: Application No. PCT/US2023/020618, dated May 5, 2022.

(Continued)

*Primary Examiner* — Dominic E Rego
(74) *Attorney, Agent, or Firm* — Chernoff, Vilhauer, McClung & Stenzel, LLP (57) ABSTRACT

Devices, systems, and methods for determining adjustments used by an upstream transmitters to set the transmit power of at least one upstream OFDMA channel, where the adjustments are made using calibration values to determine constants in continuous expression of power as a function of frequency, and thereafter using the function to determine the adjustment.

15 Claims, 5 Drawing Sheets

(56) References Cited

U.S. PATENT DOCUMENTS

| | | | | |
|---|---|---|---|---|
| 2018/0241606 A1* | 8/2018 | Li | ........................ | H04L 27/3863 |
| 2018/0294900 A1* | 10/2018 | Zhang | ..................... | H04L 27/38 |
| 2018/0332511 A1* | 11/2018 | Fan | ................... | H04W 36/0094 |
| 2019/0007094 A1* | 1/2019 | Goichberg | ............... | H04B 3/06 |
| 2019/0054499 A1* | 2/2019 | Charrel | ..................... | B06B 1/02 |
| 2019/0158195 A1* | 5/2019 | Bazzi | ................... | H04B 7/0617 |
| 2019/0222406 A1* | 7/2019 | Wang | .................. | H04L 25/0224 |
| 2020/0355804 A1* | 11/2020 | Nauen | ..................... | G01S 7/484 |
| 2021/0014085 A1* | 1/2021 | Chen | ................... | H04L 25/0224 |
| 2021/0141046 A1* | 5/2021 | Rose | ......................... | G01S 3/48 |
| 2021/0344111 A1* | 11/2021 | Kihira | .................... | H04B 17/12 |

OTHER PUBLICATIONS

"Data-Over-Cable Service Interface Specifications DOCSIS", ITU-T Draft; Study Period 2017-2020; Study Group 9, International Telecommunication Union, Geneva; CH, Apr. 16, 2020, pp. 1-234, XP044289240, Retrieved from the Internet: URL:https://www.itu/int/ifa/t/2017/sg9/docs/c/ties/T17-SG09-C-0111!R1!ZIP-E.zip CM-SP-PHYv3.1-I17-190917.pdf [retrieved on Apr. 16, 2020] sections 7.2, 7.4.13, 7.4.15, 7.4.17, 9.4.6, 9.4.7.

"Data-Over-Cable Service Interface Specifications DOCSIS 3.1 MAC and Upper Layer Protocols Interface Specification", ITU-T Draft; Study Period 2017-220; Study Group 9, International Telecommunication Union, Geneva; CH, Apr. 16, 2020, pp. 1-860, XP044289239, Retrieved from the Internet: URL:https://www.itu.int/ifa/t/2017/sg9/docs/c/ties/T17-SG09-C-0111!R1!ZIP-E.zip CM-SP-MULPIv3.1-I19-191016.pdf [retrieved on Apr. 16, 2020] section 6.

* cited by examiner

| | 3.06122E-06 | 0.003 | -0.12 |
|---|---|---|---|
| | a | b | c |
| | 5 | | 0 |
| | 5.8 | | 0 |
| | 6.6 | | 0 |
| | 7.4 | | 0 |
| | 8.2 | | 0 |
| | 9 | | 0 |
| | 9.8 | | 0 |
| | 10.6 | | 0 |
| | 11.4 | | 0 |
| | 12.2 | | 0 |
| | 13 | | 0 |
| | 13.8 | | 0 |
| | 14.6 | | 0 |
| | 15.4 | | 0 |
| | 42 | | 0 |
| | 45 | | 0 |
| | 115 | | 0.21 |
| | 185 | | 0.45 |
| | 204 | | 0.520319388 |

SYSTEMS AND METHODS FOR OFDMA POWER EQUALIZATION

CROSS REFERENCE TO RELATED APPLICATIONS

This application claims the benefit of U.S. Provisional Patent Application Ser. No. 63/338,849 filed May 5, 2022.

BACKGROUND

The subject matter of this application generally relates to systems and methods that communicate data over an access network that propagates data signals between a subscriber's a provider facility having an "edge device" at the boundary of a wide-area-network, such as the Internet, a satellite network, etc. An example of such an access network is a Cable Television (CATV) network. CATV networks have historically provided content to large groups of subscribers from a central delivery unit, called a "head end," which distributes channels of content to its subscribers from this central unit through a branch network comprising a multitude of intermediate nodes. Historically, the head end would receive a plurality of independent programming content, multiplex that content together while simultaneously modulating it according to a Quadrature Amplitude Modulation (QAM) scheme that maps the content to individual frequencies or "channels" to which a receiver may tune so as to demodulate and display desired content.

Modern CATV service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber, and to the content provider through the branch network.

To this end, these CATV head ends include a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency as a QAM signal, and converts the upstream RF data sent by cable modems from analog-to-digital format to be transmitted optically to the core. Other modern systems push other elements and functions traditionally located in a head end into the network, such as MAC layer functionality (R-MACPHY), etc.

CATV systems traditionally bifurcate available bandwidth into upstream and downstream transmissions, i.e., data is only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Later iterations of the DOCSIS standard expanded the width of the spectrum reserved for each of the upstream and downstream transmission paths, but the spectrum assigned to each respective direction did not overlap.

One recent development employs Orthogonal Frequency Division Multiplexing (OFDM) to more-efficiently utilize bandwidth. In the downstream direction, OFDM propagates a large number of signals within a single OFDM "channel" at individual subcarrier frequencies spaced from each other by distances calculated to negate interference between the subcarriers, and thereby eliminating the necessity of guardbands between subcarriers within an individual OFDM channel, thus permitting more efficient use of the spectrum. In the upstream direction, a similar system is employed, but cable modems share the subcarriers in a time-division manner. This upstream version is referred to as Orthogonal Frequency Division Multiple Access (OFDMA).

Unfortunately, signal attenuation increases over a transmission medium as frequency increases, meaning that higher frequency signals must be transmitted from the source at a higher power level than lower frequency signals, if the receiver is to receive them at the same power level. Traditionally, this "tilt" could be corrected because a CMTS and/or cable modem could determine received power levels at each channel, which each spanned a small frequency range, and instruct the transmitter to adjust the transmit power to "equalize" received power across the spectrum. Because the channel widths involved were so low, any variation in power across the spectrum encompassed by the single channel is negligible, and each channel could be adequately represented by a measurement of single power level within that channel, and the measurements of multiple such channels then equalized by the CMTS as described above.

With OFDMA, however, each channel may be up to 96 MHz wide and accommodates a large number of discrete signals, hence the power level in the 96 MHz wide channel varies considerably within that channel. This causes problems in upstream nodes that combine signals from different sources such as cable modems that transmit signals within very wide OFDMA channels; the upstream transmitters need to be instructed to transmit at respective power levels that are equalized at the inputs of the upstream node, but no single measurement of power within an OFDMA channel will be representative of the power of all the signals within the channel.

What is desired, therefore, are systems and methods that calculate an appropriate transmit power for upstream ODFMA transmissions.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Orthogonal Frequency Division Multiplexing (OFDM) technology was introduced as a cable data transmission modulation technique during the creation of the CableLabs DOCSIS 3.1 specification. DOCSIS (Data Over Cable Service Interface Specification) is a set of standards for the transmission of high speed data services over cable systems. Cable plant services are primarily of two types, digital video programming services and high-speed data services. Digital video programming services have a pre-defined data capacity utilizing lower-order QAM modulation, and these signals are less impacted from ingress of external spectral energy. Conversely, given the ever-increasing demand for high speed data services, in both upstream and downstream directions, higher order modulations are required to increase the channel capacity for these services. Increased modulation orders allow for greater bits per hertz of spectrum but also require greater signal to noise environments to operate. Ingress noise may prevent these systems from operating at peak bits per hertz data rates.

The DOCSIS 3.1 standard introduced OFDM (Orthogonal Frequency Division Multiplexing) as a method to provide greater transmission bandwidth for high-speed data services. OFDM technology was defined for use directly in the downstream direction and was adapted for multiple access (Orthogonal Frequency Division with Multiple Access—OFDMA) for use in the upstream direction. As explained in further detail below, in each direction (upstream/downstream), the relatively wide channel is subdivided into many small subcarriers. Specifically, with OFDM, a downstream data channel may be defined up to 196 MHz for the carriage of data services, and this 196 MHz band is further broken into 50 kHz sub-carriers such that there are up to 3880 sub-carriers within a full 196 MHz OFDM channel. Each of the sub-carriers are effectively an independent transmission channel in that each sub-carrier may utilize its own radio modulation (within the available standards modulations available) depending on the signal to noise ration within its 50 kHz channel. To put into a more familiar perspective, a 50 kHz bandwidth is 5 times the bandwidth available from AM radio today. A single 196 MHz OFDM channel would be able to carry over 15,000 AM radio stations. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

Orthogonal Frequency Division Multiplexing (OFDM) extends the FDM technique by using multiple subcarriers within each channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme (e.g., QPSK, 16QAM, etc.) at low symbol rate. However, the combination of many subcarriers enables data rates similar to conventional single-carrier modulation schemes within equivalent bandwidths.

Figure 1:
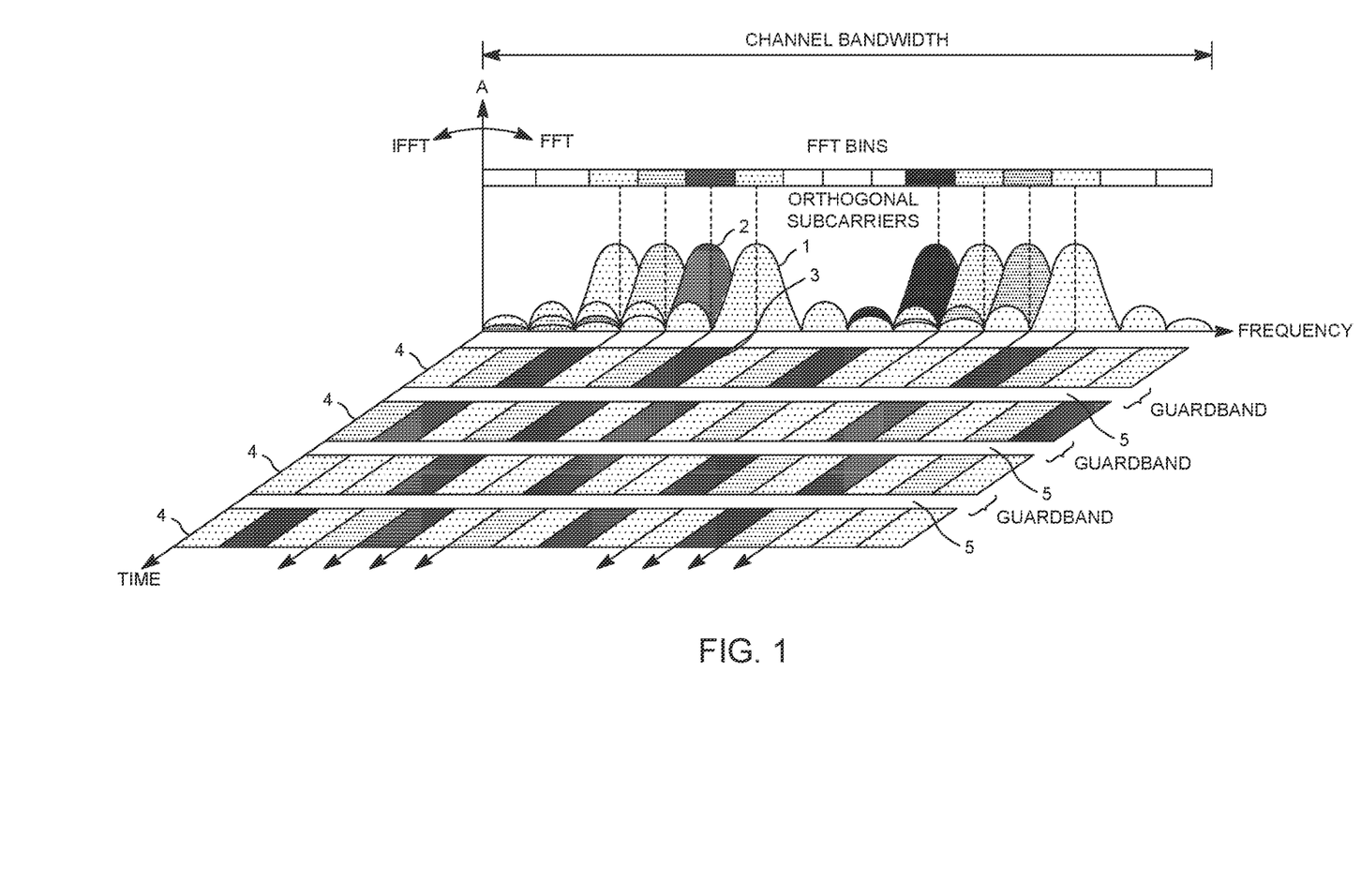
FIG. 1 illustrates an Orthogonal Frequency Division Multiplexing technique.

Referring for example to FIG. 1, in the frequency domain, adjacent orthogonal tones or subcarriers 1 and 2 may be each independently modulated with complex data. Though only two subcarriers are illustrated in FIG. 1, those of ordinary skill in the art will appreciate that a typical OFDM transmission will include a large number of orthogonal subcarriers. As just note noted, subcarriers 1 and 2 (as well as all other subcarriers) are orthogonal to each other. Specifically, as can be seen in FIG. 1, subcarrier 1 has spectral energy comprising a sinc function having a center frequency 3 with sidebands having peaks and nulls at regular intervals. These sidebands overlap those of subcarrier 2, but each of the spectral peaks of subcarrier 1 align with the nulls of subcarrier 2. Accordingly, the overlap of spectral energy does not interfere with the system's ability to recover the original signal; the receiver multiplies (i.e., correlates) the incoming signal by the known set of sinusoids to recover the original set of bits sent.

In the time domain, all frequency subcarriers 1, 2, etc. of a single OFDM channel are combined in respective symbol intervals 4 by performing an Inverse Fast Fourier Transform (IFFT) on the individual subcarriers in the frequency domain. Guardbands 5 may preferably be inserted between each of the symbol intervals 4 to prevent inter-symbol interference caused by multi-path delay spread in the radio channel. In this manner, multiple symbols contained in the respective subcarriers can be concatenated to create a final OFDM burst signal. To recover the signal at a receiver, a Fast Fourier Transform (FFT) may be performed to recover the original data bits.

Figure 2:
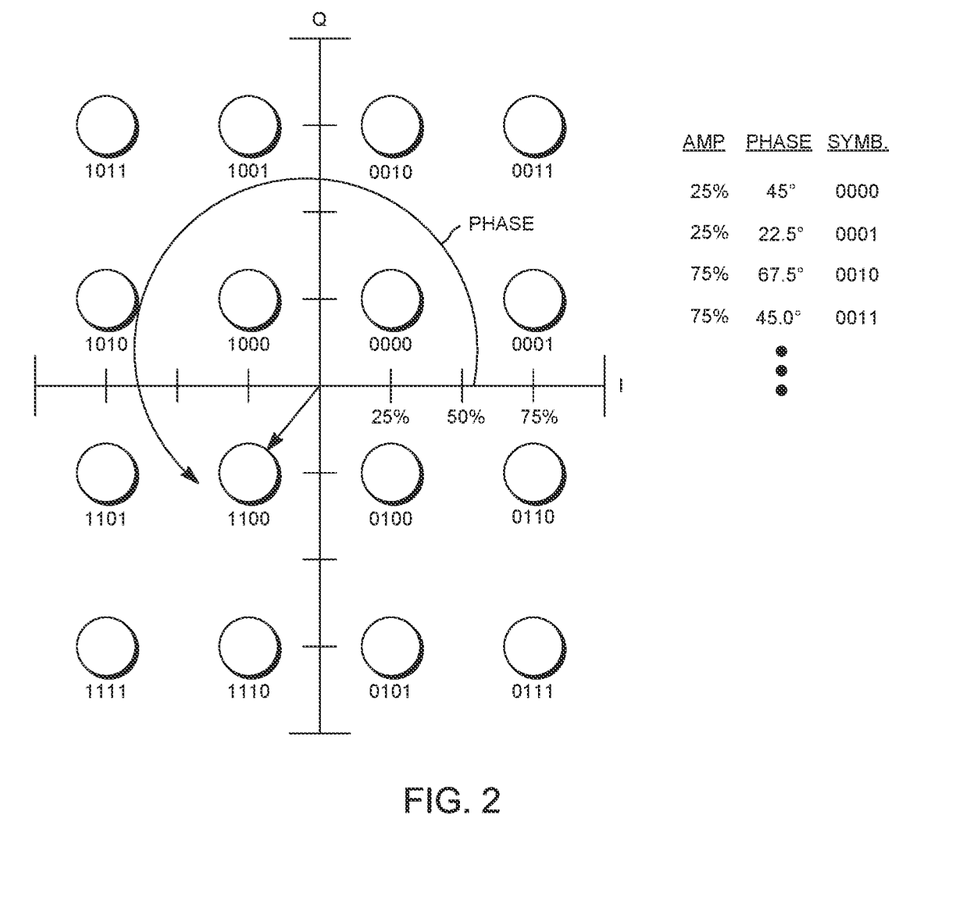
FIG. 2 illustrates a Quadrature Amplitude Modulation technique.

As also noted previously, each subcarrier in an OFDM transmission may be independently modulated with complex data among a plurality of predefined amplitudes and phases. FIG. 2, for example, illustrates a Quadrature Amplitude Modulation (QAM) technique where a subcarrier may be modulated among a selective one of sixteen different phase/amplitude combinations (16QAM). Thus, for example, subcarrier 1 of FIG. 1 may in a first symbol interval transmit the symbol 0000 by having an amplitude of 25% and a phase of 45° and may in a second symbol interval transmit the symbol 1011 by having an amplitude of 75% and a phase of 135°. Similarly, the subcarrier 2 may transmit a selected one of a plurality of different symbols.

FIG. 2 illustrates a 16QAM modulation technique, but modern DOCSIS transmission architectures allow for modulations of up to 16384QAM. Moreover, each of the subcarriers 1, 2, etc. shown in FIG. 1 may operate with its own independent QAM modulation, i.e. subcarrier 1 may transmit a 256QAM symbol while subcarrier 2 may transmit a 2048QAM symbol. Thus, in order for a receiver and a transmitter to properly communicate, a bit loading profile is a vector that specifies, for each subcarrier, the modulation order (16QAM, 256QAM, etc) used by the subcarrier during a symbol interval. The current DOCSIS 3.1 specification allows each cable modem to be assigned up to five different bit loading profiles in the downstream direction, and up to two different bit loading profiles in the upstream direction. The bit loading profile used for a given symbol interval is communicated between the cable modem and a head end, so that transmitted information can be properly decoded.

Figure 3:
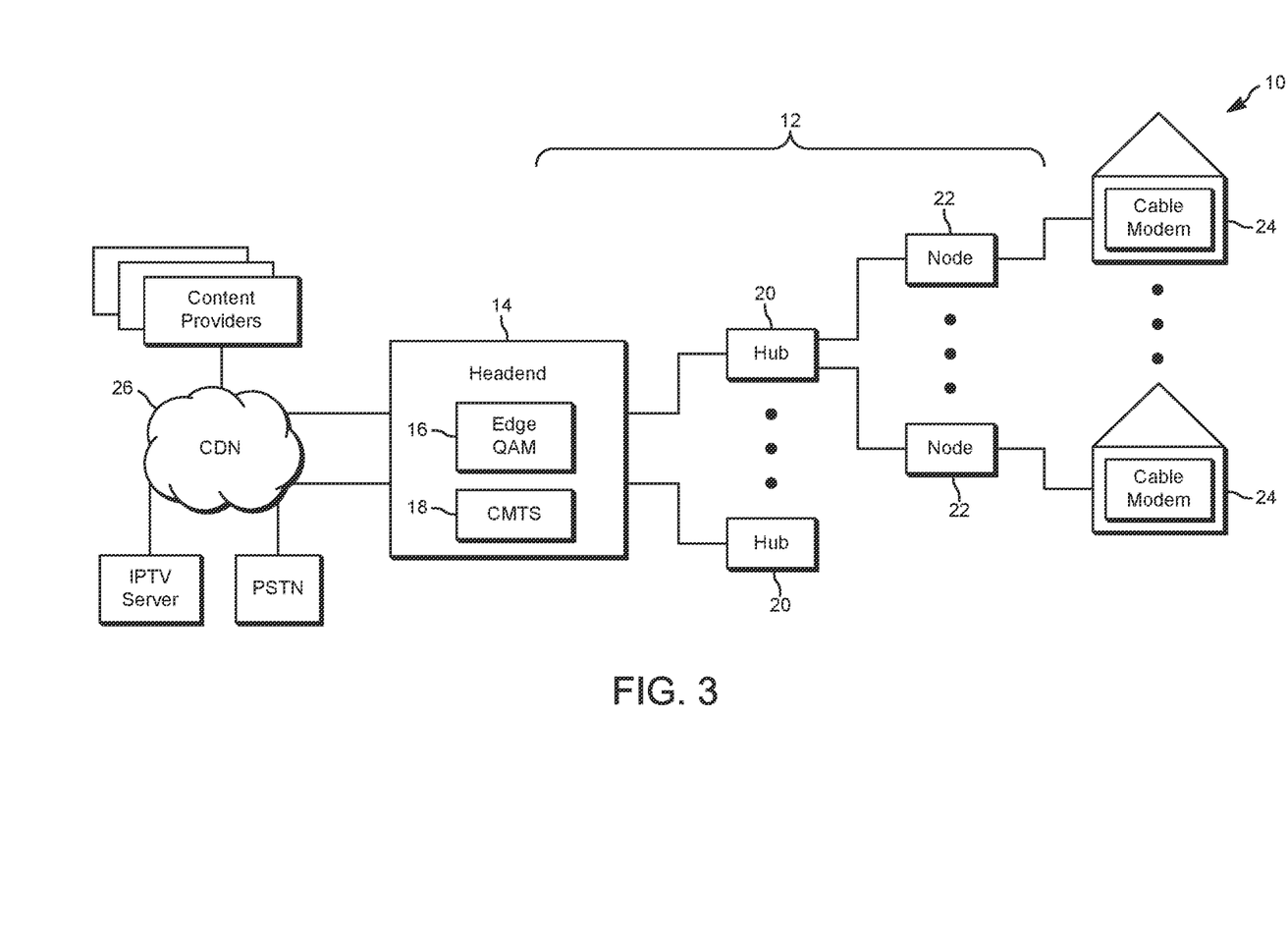
FIG. 3 shows. an exemplary system that may employ the systems and methods described in this specification.

FIG. 3 shows an exemplary architecture 10 comprising an HFC network 12 that includes a head end 14 delivering content to subscriber equipment 24 at subscriber premises, shown in the figure as a cable modem but those of ordinary skill in the art will understand that subscriber equipment could include set-top boxes, gateways, wireless phones, computers, etc. The HFC network 12 includes a head end 14, a plurality of hubs 20, and associated with each hub, a plurality of nodes 22 and a plurality of subscriber equipment 24 such as cable modems. The head end 14 typically includes a cable modem termination system (CMTS)18 and a plurality of video EQAM units 16. Each of the nodes 22 has one or more corresponding access points, and each subscriber may have one or more corresponding network elements 24, shown in FIG. 1 as a cable modem.

In HFC architecture 10, video is modulated onto the RF network by VEQs 16, which receives Internet-Protocol (IP) encapsulated Single & Multiple Program Transport Streams (SPTSs & MPTSs) from various sources (content providers, etc.) through content delivery network 26. The content delivery network is typically a switching network by which packetized IP data is routed from one address to another.

Though FIG. 3 shows a centralized architecture in which the EdgeQAM unit 16 and CMTS 18 are located in a head end 14, as noted earlier, other distributed architectures move much of the functionality (e.g., physical layer and/or MAC layer processing) of the EQAM/CMTS into the nodes of the network in distributed architectures such as R-PHY, R-MACPHY, etc. Those of ordinary skill in the art will appreciate that the disclosed systems and methods may be used within either a centralized architecture shown in FIG. 1 or in a remote device of such a distributed architecture.

As noted previously, communication systems that use OFDMA to transmit upstream data can be configured with much wider channel (up to 96 MHz of active spectrum) as compared to traditional upstream SC-QAM channels. Because attenuation at higher frequencies is greater than that at lower frequencies, the power level across the band of OFDMA sub-carriers may vary considerably; while the CMTS 18 is configured to instruct cable modems to equalize power transmit levels across subcarriers within a given OFDMA channel, there is no easy method of determining a target or desired overall or average power level that the OFDMA channel itself should be set to, so that different upstream transmissions from different cable modems are equalized at the input of an upstream receiver, such as a node. This can be problematic. For example, an upstream receiver such as nodes 22 may be configured to receive a plurality of upstream signals at different inputs, and cannot tolerate too much of a discrepancy between the power at its inputs else it will not be able to distinguish signal from noise. Furthermore, even at a single input of a node 22, power loss as a function of frequency reduces available bandwidth at the upper frequencies as signal strength degrades.

The CMTS 18, however, in either a centralized or distributed architecture, does have access to calibration measurements that specify average power adjustments made at specified frequency bands across the entire upstream spectrum. The devices, systems, and methods disclosed in this application use those discrete measurements to determine a function of power, continuous over the entire upstream spectrum, and from that determined function, calculates a power adjustment to be made at a selected, discrete frequency within a single upstream OFDMA channel. In preferred embodiments, this selected discrete frequency may be the center frequency of the OFDMA channel.

For example, in one embodiment it may be presumed that power attenuation (and hence compensatory power adjustments PA) varies as a second-order polynomial function of frequency generalized by the equation $$PA = aF^2 + bF + c \qquad (\text{Eqn 1})$$

where PA is a desired power adjustment, F is the center-frequency at which a power adjustment is to be made, and a, b and c are three constants that need to be calculated.

Preferably, disclosed devices, systems, and methods receive discrete power adjustments calculated across several OFDMA channels. Those of ordinary skill in the art will appreciate that devices that employ the disclosed techniques will vary depending on the architecture. For example, in a centralized architecture such as that disclosed in FIG. 3, the disclosed techniques may be employed by the CMTS 18. In other architectures, particularly distributed access architectures, the disclosed techniques may be employed by a Remote MACPHY Device (RMD), Remote Physical Device (RMD), etc.

For example, in one embodiment CMTS 18 may be configured to measure received power at the high, mid, and low split points supported by the various DOCSIS iterations, and instruct cable modems to make compensatory adjustments accordingly. Assume, for example, that CMTS 18 calculates appropriate power adjustments of 0.00 at the low split point of 45 MHz, 0.21 at the mid-split point of 115 MHz, and 0.45 at the high split point of 185 MHz. With these values, the following equations would hold true:

$$a45^2 + b45 + c = 0$$

$$a115^2 + b115 + c = 0.21$$

$$a185^2 + b185B + c = 0.45.$$

Given these equations, a continuous curve that runs through all three points may be calculated as:

$$PA = 3.06 \times 10^{-06}F^2 + 2.51 \times 10^{-03}F - 1.19 \times 10^{-01}$$

Figure 4:
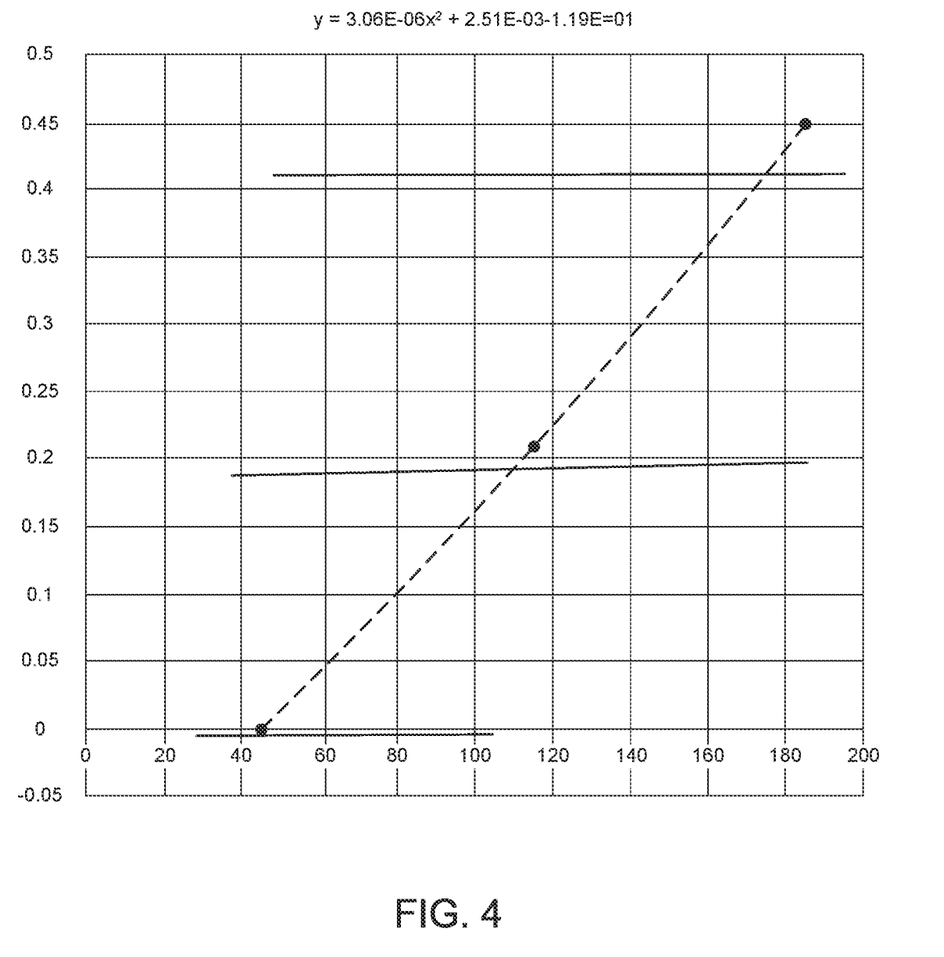
FIG. 4 shows an exemplary function used for adjusting power levels within one or more OFDMA channels.
Figure 5:
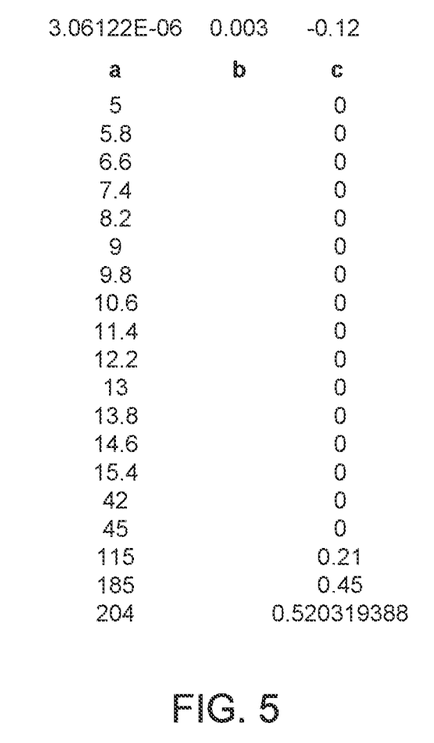
FIG. 5 shows exemplary power adjustment levels for OFDMA subcarriers within upstream OFDMA channels.

FIG. 4 shows this curve.

This equation can in turn be used by a CMTS 18 to instruct cable modems 24 to transmit an upstream OFDMA channel at an average power level set to the value calculated for the center frequency as just described. It should be appreciated that the foregoing method is fully compatible with existing techniques by which a CMTS 18 equalizes power levels of subcarriers within an OFDMA transmission by any given cable modem 24.

Those of ordinary skill in the art will appreciate that the foregoing example was described for illustrative purposes only, and many variations on this example can be easily employed. For example, the generalized polynomial formula of equation 1 could be broadened to a third-order or higher polynomial equation, particularly if more sample-point power levels are available and it is desired that they be used. Other implementations may assume other generalized functions, including linear functions, exponential functions, etc. Furthermore, more or less than three calibration values may be collected and used to determine any constants in the generalized formula exemplified by equation 1.

Figure 6:
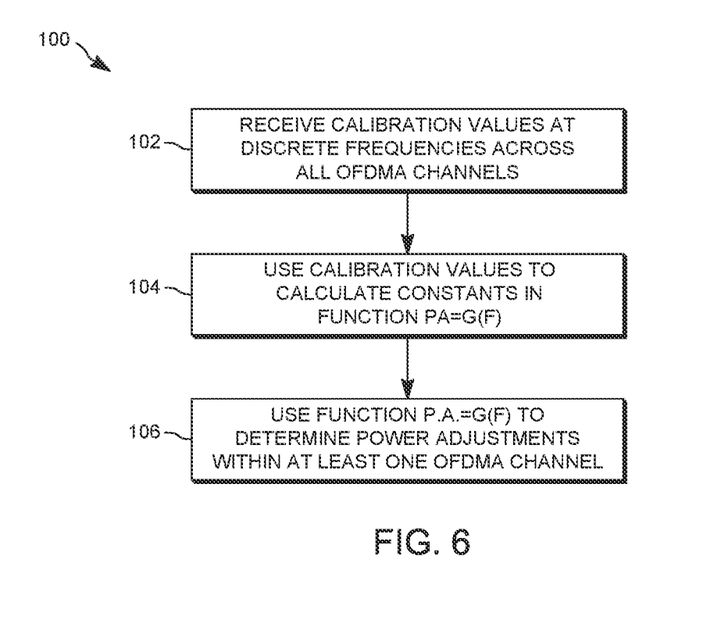
FIG. 6 shows an exemplary method for determining power adjustment levels within one or more OFDMA channels.

FIG. 6 shows an exemplary method 100 according to the present disclosure. In preferred embodiments, the method 100 may be performed within a processing device of a head end or remote device in a communications network, such as an RPD, RMD, etc. In other embodiments, however, the method may be implemented in white-box hardware connected locally or remotely to a CMTS or similar receiver that receives upstream signals from cable modems or other such user equipment. In some embodiments, the processing device may be configured to repeatedly collect measurements and adjust the equalization values as plant conditions change i.e., the constants in the generalized formula exemplified by equation 1 change.

In the method 100, at step 102, calibration values are received for discrete frequencies across a plurality of OFDMA channels. In some embodiments, this step may comprise measuring power levels of respective upstream signal received from one or more cable modems 24, at a number of discrete frequencies, and calculating power adjustments necessary to equalize the received power at those frequencies. Preferably, calibration values are received for discrete frequencies across all OFDMA channels.

At step 102, the calibration values are used to calculate constants in a function PA=G(F) that expresses power adjustments as some continuous function of frequency. The form of the function PA=G(F) may vary depending on the embodiment, i.e., some embodiments may use a second-order (or higher order) polynomial as this function, other embodiments may specify a linear function, an exponential function, etc.

At step 106, once the constants of the function PA=G(F) are calculated, the function may preferably be used to determine a power adjustment value associated with the upstream transmissions of the OFDMA channel as a whole, e.g., a power level at the center frequency of the OFDMA channel. An upstream transmitter, such as a cable modem, may then be instructed to transmit the OFDMA channel at a power level conforming to that determination.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method comprising:
receiving calibration values determined from a plurality of received upstream signals at different respective frequencies;
using the calibration values to determine constants in a continuous function relating power adjustment to signal frequency;
using the continuous function to determine a power adjustment associated with an entire OFDMA channel; and
instructing at least one upstream transmitter to transmit an upstream OFDMA signal conforming to the determined power adjustment.

2. The method of claim 1 where the continuous function is a polynomial function.

3. The method of claim 2 where the polynomial function is a second order function.

4. The method of claim 1 where at least three calibration values are received.

5. The method of claim 1 where the determined power adjustment is associated with a center frequency of the OFDMA channel.

6. The method of claim 1 implemented in at least one of CMTS and a remote device in a distributed access architecture.

7. The method of claim 1 where the calibration values together span more than one upstream OFDMA channel.

8. A device having a processor configured to:
receive calibration values determined from a plurality of upstream signals;
use the calibration values to determine constants in a continuous function relating power adjustment to signal frequency;
use the continuous function to determine a power adjustment associated with an entire OFDMA channel; and
instruct at least one upstream transmitter to transmit an upstream OFDMA signal conforming to the determined power adjustment.

9. The device of claim 8 where the continuous function is a polynomial function.

10. The device of claim 9 where the polynomial function is a second order function.

11. The device of claim 8 where at least three calibration values are received.

12. The device of claim 8 where the determined power adjustment is associated with a center frequency of the OFDMA channel.

13. The device of claim 8 comprising at least one of CMTS and a remote device in a distributed access architecture.

14. The device of claim 13 comprising at least one of an RPD and an RMD.

15. The device of claim 8 where the calibration values together span more than one upstream OFDMA channel.

* * * * *